C. G. HAWLEY.
WHEEL FOR AUTOMOBILES.
APPLICATION FILED FEB. 9, 1920.
1,399,719.
Patented Dec. 6, 1921.
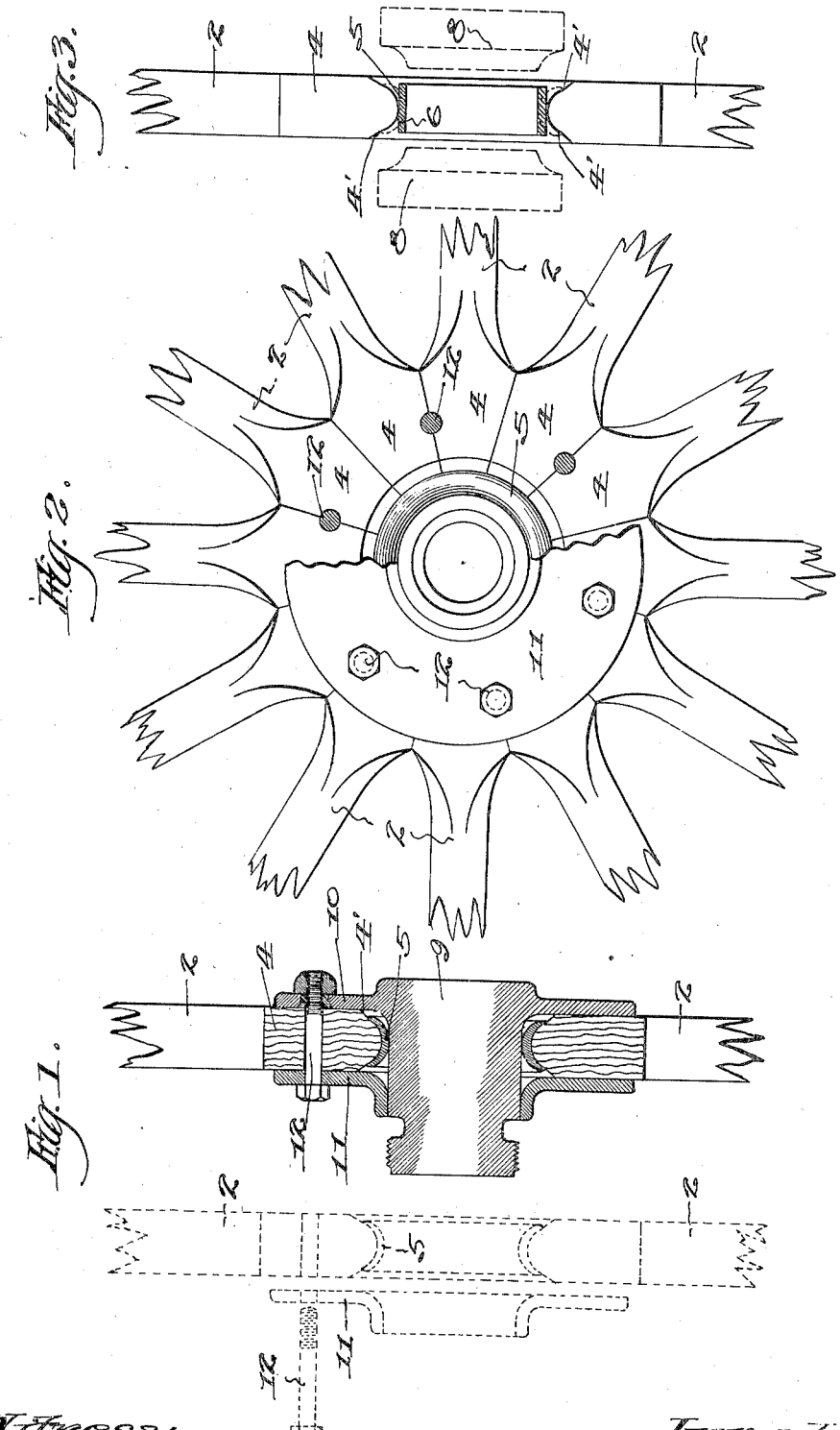

UNITED STATES PATENT OFFICE.

CHARLES GILBERT HAWLEY, OF CHICAGO, ILLINOIS, ASSIGNOR TO BAKER WHEEL & RIM COMPANY, OF CHICAGO, ILLINOIS, A CORPORATION OF ILLINOIS.

WHEEL FOR AUTOMOBILES.

1,399,719.      Specification of Letters Patent.      Patented Dec. 6, 1921.

Application filed February 9, 1920. Serial No. 357,440.

*To all whom it may concern:*

Be it known that I, CHARLES GILBERT HAWLEY, a citizen of the United States, and a resident of Chicago, county of Cook, and State of Illinois, have invented certain new and useful Improvements in and for Wheels for Automobiles, of which the following is a specification.

My invention relates to improvements in motor wheels of the class having spokes which are mitered at their inner ends and assembled to form a wooden hub center. Such spokes are not slipped into the hub, but are made in such form that the completely assembled wheel may be placed on a suitable metal hub and secured thereto between hub flanges.

In manufacturing and assembling wooden wheels, the wheels are made up without being fitted to the permanent hubs, and in the handling and shipping of such wheels the spoke butts at the hubs, which are usually held against transverse movement only by frictional engagement with one another, are often jarred and loosened or become somewhat warped. This loosening of the hub center of the wheel greatly lessens the strength, and consequently the commercial value thereof.

It is the object of my invention to provide a wheel center construction which will make impossible any individual spoke movement after the wheel is once made up, and to greatly increase the strength and commercial value of the wheel.

The general nature and details of my invention will be readily understood on reference to the accompanying drawings, which illustrate the demountable wheel, and wherein:—

Figure 1 is a large detail wheel center and hub taken from Fig. 2, the dotted line showing the wheel, the movable hub flange, and the bolts removed from the hub;—

Fig. 2 is a face-view of the center portion of the wheel containing the hub;—

Fig. 3 is a section of the wheel center construction shown in the process of assembly, the dotted lines indicating the pressing and forming dies.

The particular wheel herein depicted comprises the radial wooden spokes, 2, and a fixed rim (not shown), the latter being an endless ring of metal having integral side flanges, 3', 3', adapted to receive the pneumatic tire, T. This wheel is further characterized by the hub center, 3", which comprises spoke butts, 4, which are compressed and firmly seated one against the other. Wheels of the general character described are, after assembly, centrally bored to form a hub-hole. In the application of my invention to such wheels, the portion of the hub center, adjacent the hub-hole, is beveled or tapered at 4', for the purpose to be hereinafter described.

In order to retain the spokes against transverse and radial movement, I provide a metallic sleeve or ring, 5, adapted to be inserted into the hub-hole, 6, in the wheel center. This metal ring, 5, is of such diameter that, after it is assembled in the finished hole in the wheel center, the wheel can be easily slipped on to and off of its complementary permanent hub. The sleeve or ring as inserted into the hub-hole is preferably a section of seamless steel tubing, and after insertion the ends thereof are preferably spun, rolled or pressed over, as by means of a die, as indicated by the numeral 8 in Fig. 3 of the drawings. This piece of tubing which forms the sleeve or ring, is of such length that, when the ends thereof have been turned or spun over by the die, or by other appropriate operation, they will extend outwardly to a point short of the sides of the spokes, leaving the ends quite far removed from the faces of the wheel center, as is shown in Fig. 1 of the drawings. The ring now becomes a unit with the wheel, and securely locks the spokes in place against "climbing" or radial displacement. As is shown in Fig. 1 of the drawings, the spinning over of the ends of the sleeve causes the formation of lateral flanges thereon, which flanges coincide with and engage the beveled or tapered edges of the hub-hole. This construction causes the flanges to lie below the plane of the sides of the spokes, as above explained, and does not therefore interfere with the application of the bolt flanges of the hub. Moreover, the engagement of the side flanges of the ring, 5, with the sides of the spokes, prevents lateral or transverse movement of the spokes, as will be clearly understood. The wheel unit can now be handled on and off the hub and in shipment without danger of loosening the spokes.

It is to be noted that the spoke locking ring presents a convex inner surface or periphery which makes substantially a single line of contact with the barrel of the vehicle hub. It does not fit the same so tightly as to prevent the easy rocking of the wheel on the hub in the act of placing it thereon or removing it therefrom. Yet the fit is so tight as to effectually center the wheel on the hub. This feature of my invention obviously may be secured in various modifications of this locking ring idea, and in modifications wherein the ring may be made in more than one part if desired. The advantage of the single line of contact, and moreover a single line of contact which is restricted virtually to the middle plane of the wheel, is that it prevents the cramping or binding of the wheel on the barrel of the hub; as so often occurs with present-day wheels and which makes the removal thereof extremely difficult.

The flaring operation on the locking ring has the advantage of leaving the inner surface of the ring in a smooth or practically polished condition. From this, coupled with the single-line of contact before mentioned, it will be obvious that any detrimental rusting between the metal hub ring and the metal hub is obviated.

The ring adds greatly to the good appearance of the wheel and, further, insures the continuity of circularity in the wheel from the moment it is completed.

A further advantage of the described limited engagement between the metallic hub center ring and the hub proper is that a tight joint is effected without involving such an amount of friction as would prevent easy adjustment of the wheel on the hub.

The wheel hub, as shown in the drawings, is the part marked 9, and is characterized by the fixed back flange, 10, and the removable front flange 11, as shown. These flanges embrace the front and back of the wooden hub center and are tightened and squeezed thereagainst by means of a number of hub-bolts.

My invention has been shown as applied to a demountable wheel. Although it is especially suited to a wheel of this type, it must be understood that it is equally applicable to any wood or semi-wood wheel whether or not the wheel is to be fitted to its permanent hub at the time the wheel is made up.

Having thus described my invention, I claim as new and desire to secure by Letters Patent:—

1. The combination with a wheel provided with a complement of wooden spokes having butts which form a hub-center, and provided with a hub-hole extending through the spoke butts, of a hub adapted for insertion through said hub-hole, and a member contacting the extreme inner ends of said spokes, and affording substantially a single-line bearing for said hub.

2. The herein described wheel comprising, in combination a fixed rim or felly and a complement of radial wooden spokes presenting their outer ends thereto and at their inner ends having mitered butts which together form the hub-center portion of the wheel, said hub-center portion containing a flaring central hole, and a metal ring which contains the hub hole proper and which is expanded within the said flaring hole and is thus axially interlocked with said spoke butts.

3. The herein described wheel comprising, in combination a fixed rim or felly and a complement of radial wooden spokes presenting their outer ends thereto and at their inner ends having mitered butts which together form the hub-center portion of the wheel, said hub-center portion containing a flaring central hole, and a metal ring which contains the hub hole proper and which is expanded within the said flaring hole and is thus axially interlocked with said spoke butts, said ring being of a length which is less than the thickness of said spoke butts.

4. The combination of a wheel having a complement of wooden spokes having butts which form the wheel center and the latter provided with an over-sized hub-hole, with a hub, and a metal ring contacting the extreme inner ends of said spokes, and internally curved to present substantially a single line bearing upon said hub and thus permit relative rocking movement of the wheel on the hub at times of mounting and demounting the wheel.

In testimony whereof, I have hereunto set my hand this 5th day of February, 1920.

CHARLES GILBERT HAWLEY.